Oct. 10, 1944.  W. R. TUCKER  2,360,023

CONTROL OF WELD LINES

Filed April 28, 1942

INVENTOR
WARREN R. TUCKER
BY
Toulmin & Toulmin
ATTORNEYS

Patented Oct. 10, 1944

2,360,023

UNITED STATES PATENT OFFICE 2,360,023

CONTROL OF WELD LINES

Warren R. Tucker, Dayton, Ohio, assignor to The Hydraulic Development Corp. Inc., Mount Gilead, Ohio, a corporation of Delaware Application April 28, 1942, Serial No. 440,825

2 Claims. (Cl. 18—42)

This invention relates to an injection molding apparatus for eliminating weld lines between two or more masses of plastic material.

Weld lines are the visible results of the meeting of two streams of resin in a die, these streams having been cooled by contact with the surfaces of the die to the extent that they do not fuse completely with one another. They are usually surface defects, but may also represent points of structural weakness.

The prevalence of weld lines in molded articles of all descriptions has made injection molding of complicated shapes difficult. It has heretofore been necessary for the die designer to give special attention to his design from the standpoint of this problem, making allowances for the rate and direction of flow of the resins in all parts of the die, or perhaps providing pockets at the expected weld points into which the cooled material would flow, and later be removed from the work piece.

The present invention eliminates this recurring problem in die design by providing for the localized heating of the weld points of the die. After designing a die that is satisfactory in other respects, the locations at which weld points are apt to occur are noted, and a small cartridge type electric heater is inserted in the walls adjacent these locations. Weld points can generally be predicted without much trouble, but an advantage of this invention is, that even after a trial run, heaters may be inserted where weld lines unexpectedly appear.

An object of the invention is to provide an apparatus for injection molding plastic articles to produce an article having uniform strength characteristics throughout the entire mass of the article.

Another object of the invention is to provide an apparatus for injection molding an article so that the article will have a uniform surface finish.

Another object of the invention is to eliminate weld lines between masses of plastic material that are brought into engagement with one another during the injection molding process.

Another object of the invention is to prevent rapid chilling of plastic material while being injection molded so that different masses of the material can be brought into engagement with one another without any noticeable contact or weld line.

Another object of the invention is to provide localized heating of plastic material, when injected into a mold cavity, sufficient to permit joining of the separate masses of plastic material without the appearance of a contact or weld line.

Another object of the invention is to provide localized heating in molding dies adapted to be used in a plastic injection molding process at locations in the dies most likely to receive simultaneous arrival of a plurality of plastic masses to prevent the appearance of a weld line.

Further objects and advantages will become apparent from the drawing and the following description.

Figure 1:
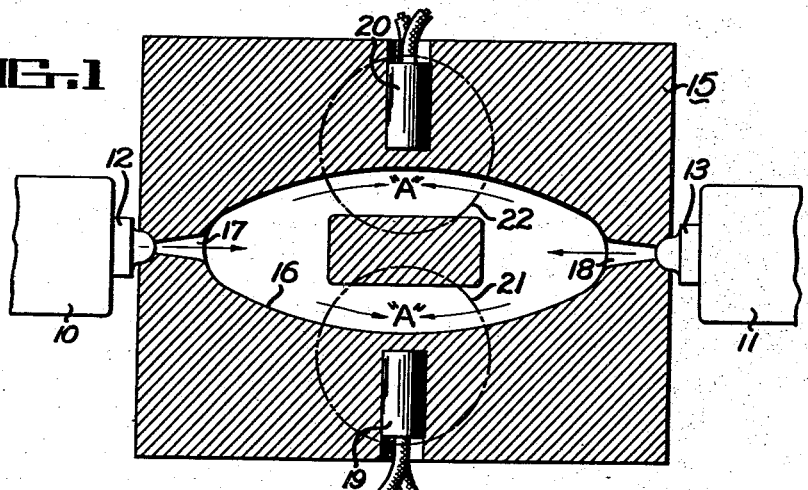
Figure 1 is a somewhat schematic cross-sectional view of a die taken on a section parallel with the parting lines having plastic material injected thereinto from a plurality of injection nozzles and showing localized heating means adjacent the weld points between the plastic masses.

When injection molding plastic materials, and particularly the thermoplastic materials, the granular material is heated in a suitable chamber to a satisfactory molding temperature. The mold is then injected into a mold cavity. The mold usually maintains a temperature approximating room temperature, normal heat radiation from the mold being sufficient to eliminate the heat of the plastic material between ejection cycles. Under certain conditions it may be necessary to cool and mold by suitable means, such as circulating fluid or air through the mold or around the mold to prevent the same from rising in temperature and thus slowing down the injection cycle. However, when the mold is maintained relatively cool and the article which is being injection molded is relatively large the plastic material chills rapidly in its passage through the various mold crevices. In many instances, the reduction in temperature of the plastice material is sufficient that if it is necessary for the plastic material to join another mass of material moving in a different direction that an unsatisfactory joint is obtained at the juncture of the mass. This weld joint, if not formed satisfactorily, produces an imperfection in the surface finish of the article and also a mechanical weakness at the joint.

In order to eliminate an unsatisfactory weld between masses of plastic material it is necessary that the temperature of the material be maintained sufficiently high when the masses are brought into engagement with one another that they will form a perfect homogeneous mass. The temperature required for obtaining a satisfactory weld joint is not as high as that required for the initial injection of the plastic material into the mold, and in fact can be considerably lower than this temperature since it is only necessary that the temperature of the weld joint be sufficiently high that the joint will weld satisfactorily and the article can be ejected from the mold.

By way of example, the conditions of molding an acetate resin can be set forth. It is of course understood that the example indicated herein will apply to all plastics, and particularly to all thermoplastics, and that the temperatures are only by way of example and are not limiting.

In a normal injection molding process an acetate resin is conventionally heated to a temperature of about 400° F. within a suitable heating chamber and it is then ejected from the chamber into a mold cavity. The temperature of the resin as it leaves the nozzle of the injection chamber will therefore be about 400° F., but may be a little lower than this due to heat transfer between the nozzle and the die or mold into which the plastic material is being injected. Since the dies or mold are maintained relatively cool, at approximately room temperature, the plastic material will immediately begin to lose its heat upon entry into the mold. As the material progresses in its passage through the mold it is chilled rather rapidly until the mold is completely filled. The injected article is ejected from the mold at approximately the temperature of the mold since a slight dwell period is provided for cooling the molded article before it is ejected.

However, when the plastic material injected into the mold is separated for traversing different parts of the mold and the separated masses are later joined together, or, when plastic material is injected by means of a plurality of injection nozzles, the reduction in temperature of the plastic material in traversing the mold is too great in many instances so that an imperfect weld line is produced between the masses of plastic material. If the die is heated in local areas by a suitable means to a relatively low temperature somewhat above the normal temperature maintained in the mold but considerably less than the temperature of injection of the plastic material, the plastic material will not cool in the locally heated areas to the same extent and with the same rapidity as in other areas so that a satisfactory weld line can be produced. The local heating of the dies need not be much greater than about 150° F., which is sufficient to maintain the material in satisfactory plastic condition for welding and yet is not too high to prevent satisfactory ejection of the molded article.

By merely locally heating the mold in particular areas, it is possible to maintain maximum cooling speed of the molded article after injection and yet produce a satisfactory weld joint. This will occur because the major portion of the mold is maintained at a relatively low temperature satisfactory for cooling the molded article, so that the withdrawal of heat from the entire molded article will be rather rapid. If the main body of the article has cooled below the temperature maintained locally in certain areas of the mold, the article can be satisfactorily ejected.

To disclose an apparatus for producing the results of this invention there is shown in Figure 1 a somewhat diagrammatic form of mold and ejection apparatus. The ejection apparatus consists of injection cylinders 10 and 11 which are suitably fed with granular plastic material. The plastic material is heated within the injection cylinders 10 and 11 by any suitable heating means as is well known in the plastic injection art. An injection plunger is adapted to reciprocate within the injection cylinders 10 and 11 for ejecting heated plastic material through the injection nozzles 12 and 13 respectively. Any of the well known injection molding apparatus is adapted to be used in this invention as a suitable source of supply for plastic material to be injected into the mold 15.

The mold 15 is provided with a mold cavity 16 having sprue passages 17 and 18 which communicate with the injection nozzles 12 and 13 respectively of the injection cylinders 10 and 11. As shown in Figure 1, the injection cylinders 10 and 11 force heated plastic material into the mold cavity 16 from opposite sides of the cavity so that there are two masses of plastic material entering the mold simultaneously which will meet one another in approximately the center portion of the mold cavity 16. A fusion between the masses of plastic material must therefore occur within the areas A. The exact location of the area A will depend upon the speed of injection from the respective cylinders 10 and 11, as well as the quantity of material being ejected from the cylinders. Assuming, however, that both of the cylinders eject like quantities of material and at approximately the same speed, the weld joint between the masses of material ejected from the cylinders 10 and 11 will occur approximately within the areas A.

To prevent the temperature of the plastic material from falling below a suitable fusion temperature when it reaches the area A of the mold cavity 16, heating elements 19 and 20 are disposed adjacent the areas A. As shown in the drawing, these heating elements 19 and 20 are cartridge type electric heaters. However, any suitable heating means can be substituted for the electric heating elements 19 and 20 which will satisfactorily produce a local heating effect in the mold 15 adjacent the areas A.

The electric heating elements 19 and 20 are of such heating capacity that they will affect an area of the mold substantially that which is confined within the area enclosed by the circles 21 and 22 respectively. It will be noted that the circular area affected by the heating elements 19 and 20 embraces the areas A within which the fusion between the masses of plastic material occurs. The areas affected by the heating elements 19 and 20 are elevated in temperature somewhat above the temperature of the body of the mold 15 and, as indicated in the example previously given, the temperature of this area may be about 150° F.

It is readily apparent that if the main body of the mold 15 is held at approximately room temperature that the article which is injection molded will be cooled relatively rapid since the larger area of the article is in contact with a cool surface. The area of the molded article confined within the area A, or the area affected by the heating elements 19 and 20 will of course be at somewhat higher temperature than the remaining body of the article, but can be ejected from the mold cavity 16, since the temperature of the area affected will not be sufficiently high to prevent such ejection.

Figure 2:
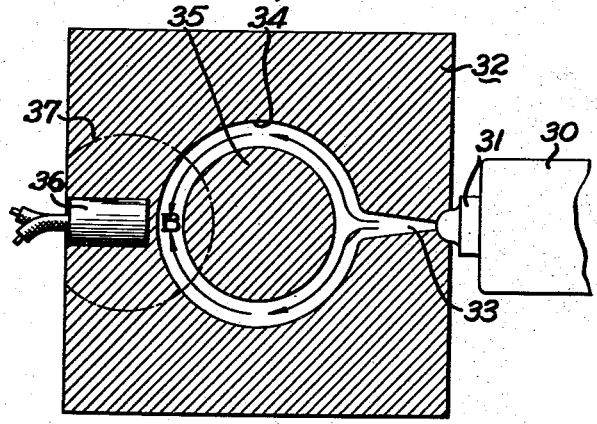
Figure 2 is a schematic cross-sectional view of a die taken on a section parallel with the parting lines having plastic material injected thereinto from a single injection nozzle, showing heating means in the die adjacent the weld point of the plastic material.

As shown in Figure 2, there is a slightly modified arrangement of the apparatus of this invention wherein a single injection cylinder 30 is provided having an injection nozzle 31. The mold 32 has a sprue 33 which connects the mold cavity 34 with the injection nozzle 31. The mold cavity 34 in this instance is circular in shape and has a central core 35. The plastic material injected into the mold cavity 34 through the sprue 33 will thus flow around the core 35 and meet on the opposite side of the mold within the area B. Fusion between the parted mass of plastic material thus occurs within the area B.

This area B is heated by a cartridge type electric heating element 36 inserted within the mold 32 to elevate the temperature of the mold body within an area substantially confined within that enclosed within the circle 37. The function of this heating element is the same as that disclosed with regard to the heating element disclosed in Figure 1 and the same satisfactory results can be obtained.

Figure 3:
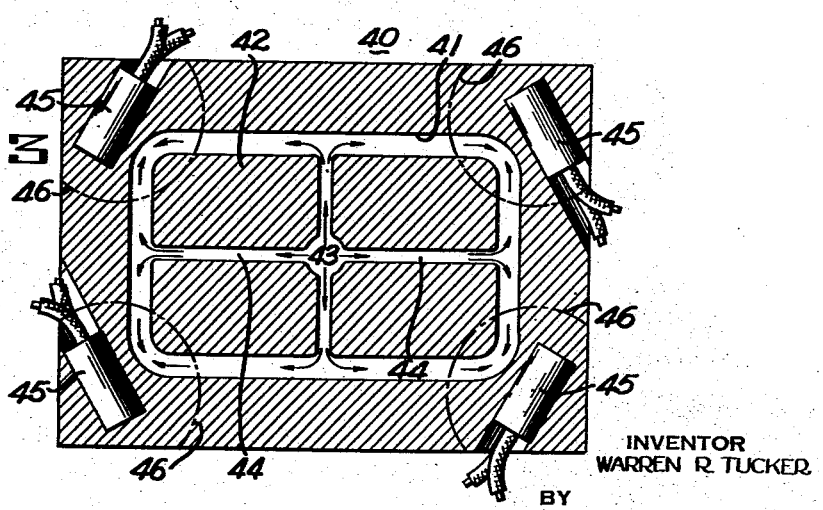
Figure 3 is a schematic cross-sectional view of a more complicated die form taken on a section parallel with the parting lines having heating means therein for locally heating the die to prevent the production of weld lines in the molded article.

In Figure 3 there is shown diagrammatically a somewhat more complicated form of mold 40 having a mold cavity 41 within which there is a core 42. The rectangular core 42 within the rectangular mold cavity 41 provides a space wherein a box-like structure can be formed.

Plastic material is admitted into the mold cavity 41 through a sprue 43 and the runners 44. The sprue 43 is located centrally within the core 42 and the runners radiate from the sprue 43 to admit the plastic material into the mold cavity 41 in a plurality of areas simultaneously, as shown by the arrows. The plastic material will flow, as indicated by the arrows, so that the fusion points between the various masses of plastic material flowing through the mold cavity 41 occur at the corners of the rectangular mold cavity 41.

To provide a satisfactory fusion joint at each corner of the mold cavity 41 and to eliminate any perceptible weld joint, a electric cartridge type heating element 45 is disposed in the mold body at each corner of the mold cavity 41. The heating elements 45 affect the area substantially confined within the circles 46 to elevate the temperature thereof slightly for producing a satisfactory fusion temperature of the plastic material.

It is of course understood that the heating elements heretofore mentioned are preferably of the cartridge type so that they can be readily removed from the mold body merely by sliding the same therefrom so that cartridges of different capacity can be inserted within the mold body at the proper locations to change the local temperature of any particular area in accordance with the temperature requirements for obtaining a satisfactory fusion joint. This interchangeability of heating elements is also desirable when changing from one plastic material to another in view of the altered injection temperature required for satisfactory injection molding of the various types of plastic materials.

It is also to be understood that the localized heating effect can be applied to any particular area of a mold at any time an unsatisfactory weld joint occurs. Also, it is possible, by localized heating of the mold, to prevent the reduction in temperature of the plastic material flowing through the mold cavity until it reaches a subsequent area so that the length of travel of the plastic material can be increased without any undue drop in temperature which would affect its flowing characteristics.

While the forms of the invention disclosed and described herein show diagrammatically a preferred form of the invention, yet it is to be understood that various mechanical modifications can be made which would fall within the spirit of this invention, and that such modifications as do fall within the scope of the appended claims are intended to be included herein.

Having thus fully described my invention, what I claim as new and desire to secure by Letters Patent, is:

1. An apparatus for injection molding comprising a block of heat conducting material of substantial thickness, said block having a mold cavity, at least one sprue passage communicating with said mold cavity, said mold block having thick walls located comparatively remotely from said sprue opening, an elongated recess extending from the outer surfaces of said block toward said cavity and partially through one of said walls but terminating short of said mold cavity to thereby provide a thin web of heat conducting material forming part of the wall of said cavity, and a removable heating means fitting within said recess and positioned in close proximity to said web, whereby the said remotely located walls of said mold cavity may be heated to thereby reheat the partially cooled plastic material which has been injected at said sprue passage.

2. An apparatus for injection molding comprising a block of heat conducting material of substantial thickness, said block having a mold cavity, at least one sprue passage communicating with said mold cavity, said mold block having thick walls located comparatively remotely from said sprue opening, an elongated recess extending from the outer surface of said block toward said cavity and partially through one of said walls but terminating short of said mold cavity to thereby provide a thin web of heat conducting material forming part of the wall of said cavity, and a removable heating means fitting within said recess and positioned in close proximity to said web, whereby the said remotely located walls of said mold cavity may be heated to thereby reheat the partially cooled plastic material which has been injected at said sprue passage, a core within said mold cavity and at least one runner extending through said core and leaving one of its ends located adjacent said sprue passage and its other end extending into said cavity at a point remote from said sprue passage.

WARREN R. TUCKER.